United States Patent
Capuani et al.

(10) Patent No.: US 12,450,743 B2
(45) Date of Patent: Oct. 21, 2025

(54) COMPUTER-IMPLEMENTED METHOD AND SYSTEM FOR DETERMINING THE FETUS VENTRICULAR VOLUME FROM DIFFUSION-WEIGHTED MAGNETIC RESONANCE IMAGING, AND RELATED NMR VENTRICLE VOLUME ASSESSMENT METHOD

(71) Applicants: CONSIGLIO NAZIONALE DELLE RICERCHE, Rome (IT); UNIVERSITÀ DEGLI STUDI DI ROMA "LA SAPIENZA", Rome (IT)

(72) Inventors: Silvia Capuani, Rome (IT); Mattia Borrelli, Fiumicino (IT); Giacomo Pratesi, Rome (IT); Maria Giovanna Di Trani, Ginosa (IT); Lucia Manganaro, Rome (IT)

(73) Assignees: UNIVERSITÀ DEGLI STUDI DI ROMA "LA SAPIENZA", Rome (IT); CONSIGLIO NAZIONALE DELLE RICERCHE, Rome (IT)

( * ) Notice: Subject to any disclaimer, the term of this patent is extended or adjusted under 35 U.S.C. 154(b) by 325 days.

(21) Appl. No.: 18/255,687

(22) PCT Filed: Nov. 29, 2021

(86) PCT No.: PCT/EP2021/083318
§ 371 (c)(1),
(2) Date: Jun. 2, 2023

(87) PCT Pub. No.: WO2022/117491
PCT Pub. Date: Jun. 9, 2022

(65) Prior Publication Data
US 2024/0013379 A1 Jan. 11, 2024

(30) Foreign Application Priority Data
Dec. 4, 2020 (IT) .......... 102020000029936

(51) Int. Cl.
G06T 7/00 (2017.01)
G06T 7/11 (2017.01)
G06T 7/62 (2017.01)

(52) U.S. Cl.
CPC .............. *G06T 7/0012* (2013.01); *G06T 7/11* (2017.01); *G06T 7/62* (2017.01);
(Continued)

(58) Field of Classification Search
CPC . G06T 7/0012; G06T 7/11; G06T 7/62; G06T 2207/10088; G06T 2207/20104;
(Continued)

(56) References Cited

PUBLICATIONS

Di Trani, Maria, "Apparent Diffusion Coefficient Assessment of Brain Development in Normal Fetuses and Ventriculomegaly" Frontiers in Physics. Oct. 2019 (Year: 2019).*

(Continued)

*Primary Examiner* — Molly Wilburn
(74) *Attorney, Agent, or Firm* — Armstrong Teasdale LLP

(57) ABSTRACT

A computer-implemented method for determining a fetus ventricular volume from DWI images is provided. The computer-implemented method involves acquiring DWI images, with a pre-set voxel height, of a fetus ventricle, the acquisition being made with a single b-value selected in a range between 200 and 1000 s/mm², selecting a ROI on each of the DWI images around the fetus ventricle, automatically clusterizing pixels in the ROI, obtaining clusterized DWI images, and calculating the fetus ventricular volume based on the number of pixels in the ROI for each of the DWI images and the pre-set voxel height. An NMR assessment system and an NMR assessment method implementing the method for determining the fetus ventricular volume are also provided.

15 Claims, 8 Drawing Sheets

(52) U.S. Cl.
CPC .......... *G06T 2207/10088* (2013.01); *G06T 2207/20104* (2013.01); *G06T 2207/30016* (2013.01); *G06T 2207/30044* (2013.01)

(58) Field of Classification Search
CPC . G06T 2207/30016; G06T 2207/30044; G06T 2207/30004
See application file for complete search history.

(56) References Cited

PUBLICATIONS

International Search Report for International Patent Application No. PCT/EP2021/083318, mailed Mar. 16, 2022.

Dubois Jessica et al., MRI of the Neonatal Brain: A Review of Methodological Challenges and Neuroscientific Advances, Journal of Magnetic Resonance Imaging, Feb. 18, 2020, pp. 1318-1343, vol. 53, No. 5, Society for Magnetic Resonance Imaging, Oak Brook, IL, US.

Makropoulos Antonios et al., A review on automatic fetal and neonatal brain MRI segmentation, Neuroimage, Jun. 28, 2017, pp. 231-248, vol. 170, Elsevier, Amsterdam, NL.

Gholipour Ali et al., Multi-Atlas Multi-Shape Segmentation of Fetal Brain MRI for Volumetric and Morphometric Analysis of Ventriculomegaly, Neuroimage, Apr. 15, 2012, pp. 1819-1831, vol. 60, Issue 3, Elsevier Inc.

Vasung Lana et al., Ex vivo fetal brain MRI: Recent advances, challenges, and future directions, Neuroimage, Jul. 15, 2019, pp. 23-37, vol. 195, Elsevier.

\* cited by examiner (a) (b)

(a) (b)

(a)

(b)

(c)

COMPUTER-IMPLEMENTED METHOD AND SYSTEM FOR DETERMINING THE FETUS VENTRICULAR VOLUME FROM DIFFUSION-WEIGHTED MAGNETIC RESONANCE IMAGING, AND RELATED NMR VENTRICLE VOLUME ASSESSMENT METHOD

The present invention relates to a computer-implemented method and system for determining the fetus ventricular volume from Diffusion-Weighted magnetic resonance Imaging, and related NMR ventricle volume assessment method.

BACKGROUND

In the last few years the strength and the benefits of a three-dimensional investigation of tissues and objects of interest through techniques such as magnetic resonance, have become an awareness for most of the experts in this field General MRI methods in the fetal and neonatal field can be found in [13] and [14].

Especially in dealing with the topic of the Ventriculomegaly (VM, which occurs in about 1 or 2 cases in 1000 ([2])), as well as in terms of technical improvements, a volumetric study of the cerebral lateral ventricles must be seen as a need and an essential step forward to a more accurate comprehension of the pathology. Since the VM is related to an anomalous enlargement of the lateral cerebral ventricles (cf. FIG. 1), its diagnosis is therefore exclusively associated to measurements of the dimensions of these brain areas. However, to date, the diagnoses is based on linear dimensions (specifically the diameter of the ventricular atrium) of a three-dimensional object (the cerebral ventricle), i.e. the diameter of the lateral ventricular atrium of the fetal brain using ultrasound or MRI spin-echo T2-weighted images is measured. The guidelines for the VM diagnosis suggest a threshold diameter of 10 mm, therefore over 10 mm the fetus is considered affected by VM. The enlargement of the ventricles can occur for a number of reasons, but in most cases, there is not a single identifiable cause and to date there is no model that explains the evolution of the disease.

Therefore, since the cerebral ventricles do not have a homogeneous and isotropic structure in space, the anomalous growth of the ventricular cavities cannot be satisfactorily quantified through images obtained by two-dimensional projections of the ventricle. This determines a classification that does not sufficiently discriminate the level of the postnatal pathology. This is why VM diagnosis by diameter method often does not reflect the expected outcome and makes the post-natal child's treatment method more ambiguous. Furthermore, it is not possible to an early diagnosis or an effective postnatal treatment. Since the ventricular diameter does not correlate with the gestational age, the current method is not able to discriminate intermediate levels or to catch the signals of an initial state of the pathology: it follows that there are many "borderline" cases of difficult classification.

It is felt the need of having a method of measurement of the fetus ventricular volume that overcomes the current diagnostic limits.

As an independent additional problem, calculation of the volume is made by contouring the ventricle by hand on the radiography. Such contouring is very often (slightly) larger than the actual volume of the ventricle and imprecise since there is no time given to the doctor to do precise contouring. An independent, additional need is felt to allow a precise calculation of the volume even with rough contouring of the ventricle. This would allow a faster volume calculation and therefore a faster diagnosis of the VM.

Object and Subject-Matter of the Invention

The object of the present invention is to provide a computer-implemented method for determining the fetus ventricular volume in the diagnosis of Ventriculomegaly. Another object of the present invention is to provide an NMR system capable of implementing the method, as well as an NMR assessment method of ventricle volume.

The subject-matter of the present invention is a computer-implemented method and NMR system for determining the fetus ventricular volume, according to the attached claims. Another subject matter of the present invention is NMR assessment method of ventricle volume according to corresponding attached claims.

DETAILED DESCRIPTION OF INVENTION EMBODIMENTS

Listing of the Figures

The invention, named VM Detector, will now be described for illustrative but not limitative purposes, with particular reference to the drawings of the attached figures, in which.

It is hereby specified that elements of different embodiments can be combined together to provide unlimited further embodiments while respecting the technical concept of the invention, as the average person skilled in the art understands without problems from what has been described.

The present description also refers to the known art for its implementation, with regard to the detailed characteristics not described, such as for example less important elements usually used in the known art in solutions of the same type.

When an element is introduced, it always means that it can be "at least one" or "one or more".

When a list of elements or characteristics is listed in this description, it means that the invention according to the invention "includes" or alternatively "is composed of" such elements.

EMBODIMENTS

Introduction to the General Method

The computer-implemented VM Detector according to the invention has been developed as part of Nuclear Magnetic Resonance (NMR) neuroimaging research based on the study of molecular diffusion of biological water in tissues, aimed at optimizing prenatal diagnostics.

The diagnostic question addressed by the Inventors concerned optimization in terms of objectivity and sensitivity of measurement and automation of VM prenatal diagnostics. The main purpose of the project was to validate the volumetric analysis of the lateral ventricles of the fetal brain as a better appraiser of the pathology than the conventional measurement of the ventricular diameter.

The VM Detector according to the invention proposes a new measure, more related to the biological nature of the effective ventricular structure that aims to become the new discriminating factor in the diagnosis of fetal VM. Indeed, the computer-implemented method of the invention reconstructs the volume of the cerebral ventricles starting from a sequence of images acquired by Diffusion-Weighted magnetic resonance Imaging (DWI) with a standard MRI protocol that is routinely performed in case of suspected pathology but not used to determine the above volume.

In this way, in the invention method, volumetric analysis is based on the automatic classification by the ventricular reconstruction algorithm starting from the water diffusion behavior inside the brain [11], which is in general an excellent classifier of the biological nature of the cerebral tissues. It was also considered advantageous to include the possibility of measuring the diameter to compare the data (diameter and volume) for a cross analysis. The prototype was developed in MATLAB® environment and the machine learning algorithms used came from packages downloaded from within MATLAB® itself.

Embodiments of the General Method

Figure 2:
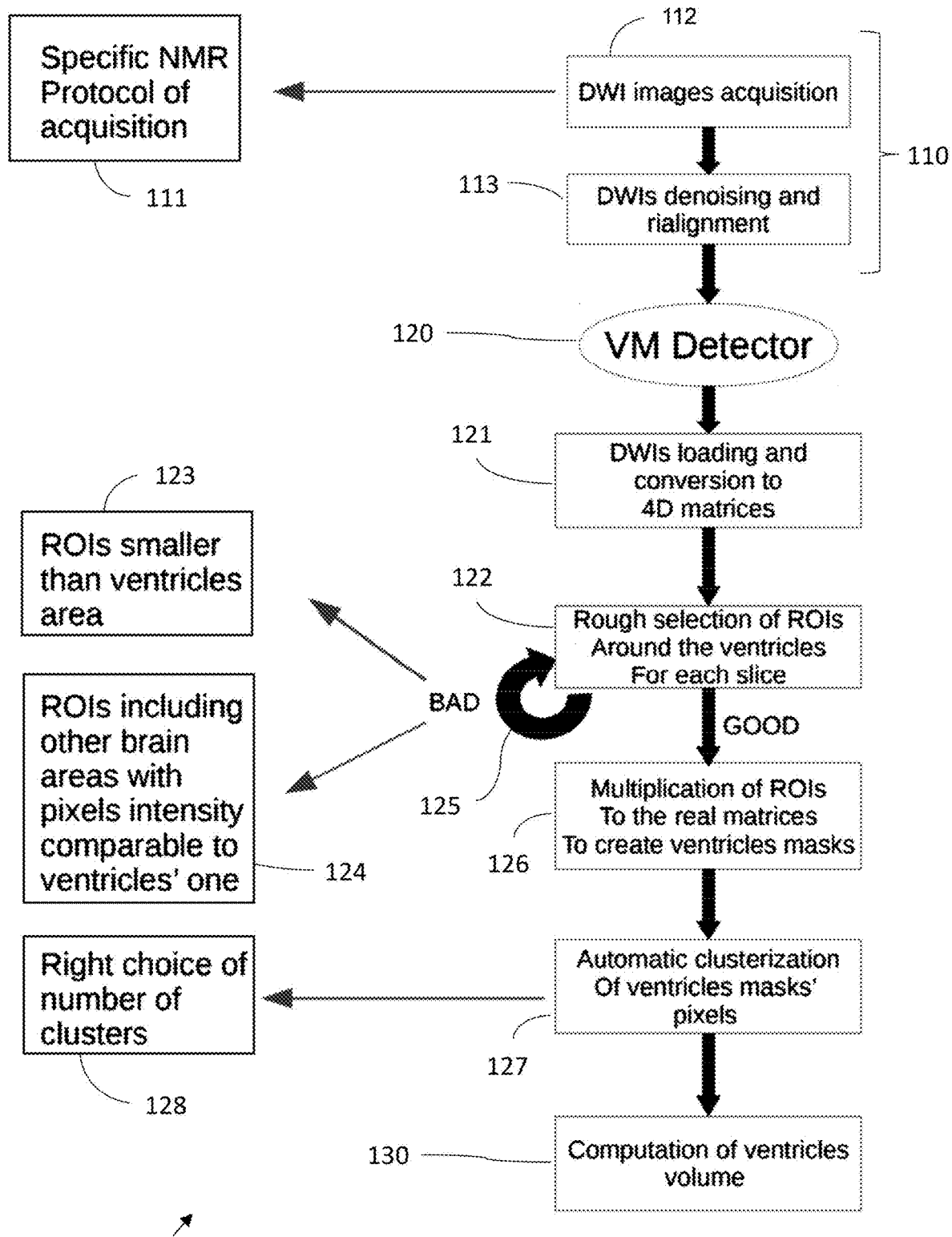
FIG. 2 shows a flow-chart for an embodiment of the method according to the invention.

The invention method is depicted in FIG. 2 according to a specific embodiment. Although the protocol is described in relation to specific tools such as MatLab®, it is to be understood that any tool can be used to the purpose once the technical concept of the invention is known.

The process 100 starts with acquisition and pre-processing of images in 110, wherein a specific protocol of NMR acquisition is used in 111 to obtain the DWI images 112. Such images are optionally pre-processed in 113 to reduce noise and effect realignment (of the acquired NMR slices, as usual in the prior art).

After the acquisition and pre-processing of images, the core method of the invention is performed in 120, which includes blocks 121-128.

In 121, the DWI images are loaded and suitably converted into 4D matrices (optional) to be able to use MATLAB® functions, and specifically to handle data in MATLAB® of DICOM images (load_untouch_nii).

In 122, a rough selection of the Regions of Interest (ROIs) is performed around the ventricles for each slice, see below for details. The outcome of the ROIs selection can be judged in 123 smaller than ventricles area or in 124 larger with inclusion of other brain areas with voxel intensity comparable to ventricle's one (with respect to a same reference scale). Both outcomes 123 and 124 are to be considered bad or unsatisfactory. In this case, step 122 is repeated (125) until the ROI selection can be considered good.

In block 126, the good ROIs are multiplied to acquired matrices (two-dimensional matrices corresponding to each slice of each acquisition) to create ventricle masks. In block 127, the ventricles masks' pixels are automatically clusterized getting the right choice of number of clusters in 128. MATLAB® functions kmeans, roipoly, getpts are used in an example.

Finally, the computation of ventricles volume is performed in 130 in various ways.

In the following, process and experiment details are given for the various blocks above.

Acquisition

The invention VM detection procedure provides for a specific acquisition protocol 111,112 comprising acquiring DWI images at only one b-value (e.g. b=700 s/mm$^2$).

Pre-Processing

Concerning in more detail the pre-processing of images in 113, according to an aspect of the invention, a realignment and, optionally, denoising procedure has been performed on the DWI images acquired at a specific b-value (e.g. equal to 700 s/mm$^2$) installed at the MRI scanner of "Umberto I" Hospital in Rome.

This pre-processing realignment and/or denoising is per se known but for completely different purposes, for example to quantify ADC in different cerebral regions of healthy and VM fetal brain (Front. Phys. 7: 160. doi: Specifically, the DWI images obtained for different b-values (at least three values, e.g. 50, 200, 700 s/mm$^2$) are used in the following way: for each acquisition pixel, the corresponding signal intensity of the DWI images at the different b-values are fitted to an exponential function to obtain the ADC value for each pixel.

Post-Processing of DWI Images

After the above optional pre-processing, the invention VM detection procedure provides in 120 for obtaining images that separate the fluid inside the ventricles from the gray/white matter in fetal brains much better than with conventional MRI. This allows to better define the contours of the ventricles and more accurately estimate the ventricular volume by clusterization.

In general, each tissue is characterized by a different diffusion behavior of biological water, which depends on the specific tissue microstructure.

Therefore, an optimum clusterization is not a priori known.

In the case of fetal brains, using a DWI image, the Inventors have found that a diffusion weight of around b=700 s/mm$^2$ was an optimum value to enhance the contours of the cerebral ventricles with respect to the white and gray matter of the fetal brain. It was also found that by carrying out tests with other values of b or by using different images other than DWI, such as conventional T2-weighted images, it is not possible to discriminate so well the ventricles from the rest of the brain tissue.

In the tests, DWI was performed at 1.5T (Siemens Avanto, Erlangen, Germany). The MRI protocol included a DW-Spin Echo EPI with TR/TE=4000/79; bandwidth=1628 Hz/px; matrix=192×192; FOV=379×379 mm$^2$. In-plane resolution=2×2 mm², slice-thickness=4 mm, NSA=2, with b-value equal to 700 s/mm² along the three (x, y, z) orthogonal axes.

Figure 3:
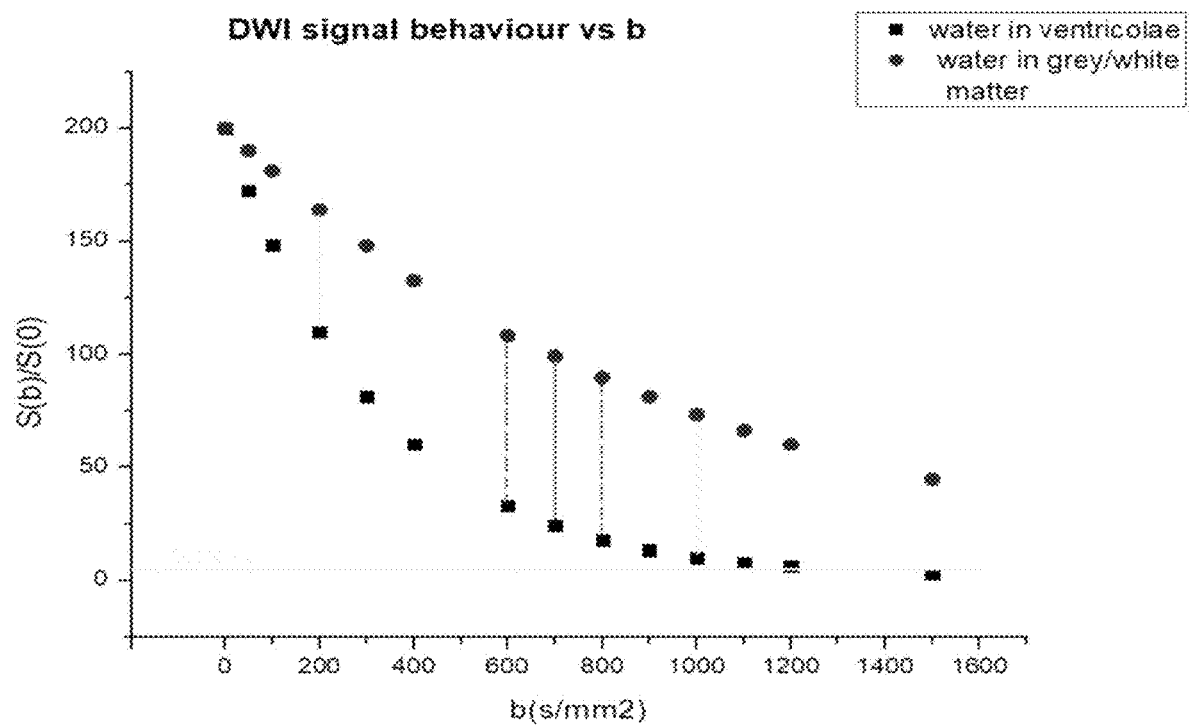
FIG. 3 shows a graph highlighting the DWI signal behavior as a function of the b-value for water in ventricle and cerebral matter.

The research of the Inventors showed that, departing from the above b-value, the clusterization is still viable. More specifically, a first broad range of applicability provided for the b value is between 200 and 1000 s/mm², while an optimal range is between 600 and 800 s/mm². In the graph in FIG. 3, the exemplary vertical lines highlight the signal difference which is proportional to the image contrast between the water in the ventricles and the water in the brain tissue.

At values higher than b=800 s/mm², problems start to arise due to the insufficient SNR. Normally DWI of sufficient quality for diagnostic purposes are characterized by SNR greater than 5. At lower b-values, problems start to arise due to the perfusion component, a confounding factor in diffusion contrast.

Figure 4:
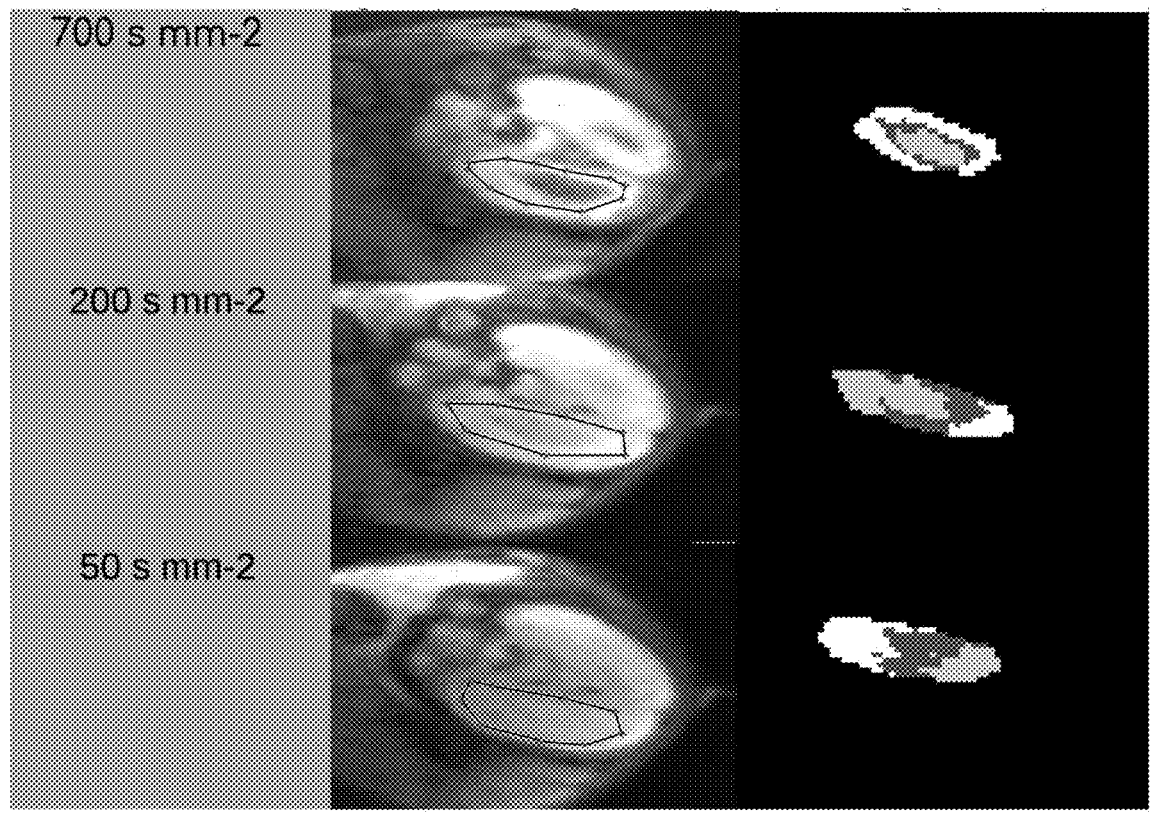
FIG. 4 shows DWI images obtained at b-value=50, 200 and 700 s/mm$^2$ by using the method according to the invention (k=4 with the k-means tool)

In FIG. 4, the DWI images obtained at 50, 200 and 700 s/mm² are displayed together with corresponding invention segmentation for k=4 in the k-means tool. From the figure, we note the segmentation differences, with the same number of clusters in k-means (k=4, which is the best k we found), made on acquisitions with different b-values but on the same slice of the same acquisition. Respectively b=700, 200, 50 s/mm². From the figure it can be seen that at b=50 s/mm² the intensity contrast between the pixels is not sufficient to distinguish the ventricle from the brain tissue. At b=200 s/mm² things are slightly better, but it is for b=700 s/mm² that the correct segmentation is obtained.

The above ranges found by the Inventors are specific to discriminate ventricles from brain tissue in fetal brain. In fact, the diffusion-weighted images obtained at different b-values are not sufficient to guarantee excellent segmentation in other investigations, especially in the case of heterogeneous tumors (such as glioblastomas). There is a large literature about this issue, and several segmentation algorithms have been developed but they all have important limitations. The problem is that in the case of heterogeneous tumors (80% of the tumors) there are many dynamics associated with different degrees of tumor and it is therefore difficult to separate all these components simply by using diffusion weighted images. Instead, in the case of VM detector we are essentially dealing with only two different dynamics, that of the free water in the ventricles and that of the hindered and restricted water in the fetal brain matter (it is worth reminding that the water dynamics in adult brains is different from the fetal ones). These two dynamics are surprisingly solved by the invention method with the above b-values, which in literature did not show such a property.

The above acquisitions have been in the conventional DICOM world format and could be opened and managed with a specific program called @FSL: the Inventors resorted to this software for the control and parallel verification of the results and the acquisition data. These images were converted thanks to the load_untouch_nii function above into 4D matrices of dimensions 192×192×30×1, where 1 is the number of b-values; 30 is the number of axial sections of the fetal head and the number of which runs from 1 to 30 along the fetal head (e.g. along the z axis); 192×192 are instead the dimensions of each 2D section (e.g. in the x-y plane).

The physical dimensions of each pixel of a slice were of 1.97×1.97 mm², the height of each voxel is 4 mm and each slice is taken every 4 mm, in order to cover the entire fetus during the acquisition (we know these values from the parameters set in the acquisition protocol, where the resolution on the plane defines the base of the voxel (which is given by the Field of View, FOV, divided by the acquisition matrix) while the height of the voxel is given by the thickness of each acquired slice).

Extrapolation of ventricle volumes and diameters is effective after careful segmentation of the fetal brain in the image itself. To this end, in order to eliminate possible motion artifacts, the Inventors have realigned DWI images using FSL flirt, a feature of the @FSL software dedicated to removal of noise and motion artifacts in the image.

ROIs Definition

Figure 5:
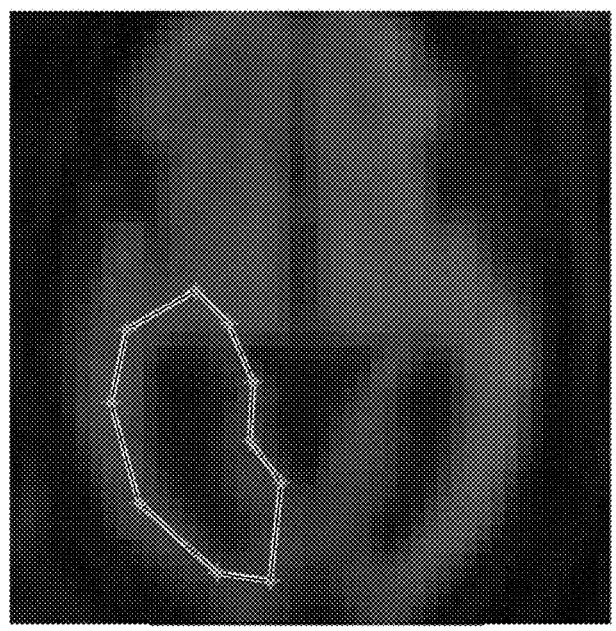
FIG. 5 shows a manual realization of the ROI by the use of roipoly.

Concerning the ROIs definition in block 112-126, preliminarily and optionally according to the invention, the dataset was narrowed for each slice into polygons around the ventricles, taking care not to include the cerebrospinal fluid (CSF) and the third ventricle: the resulting polygonal areas are the regions of interest (ROI) of the segmentation. This was done by roipoly which allows the user to manually draw and select polygons in an image (FIG. 5). It is preferable that the areas selected with roipoly are approximated around the ventricle so that the pixels passed to k-means also include other brain areas in order to maximize the precision of the segmentation, see also the difference shown in FIG. 6.

The invention would achieve its objective even in case that an algorithm for automatic contouring is used.

The pixels of this polygon were then passed to k-means to be grouped and segmented based on the intensity of each pixel, obtaining a typical result as shown in FIG. 5, as explained below.

Segmentation of Volume

Concerning the segmentation of block 127, the segmentation of the ventricles was done automatically, using an existing algorithm which is essentially a machine learning based algorithm, called k-means. This algorithm consists of a clustering operation made on a group of elements, which are divided into k different clusters, whose elements are similar in some properties to others of the same cluster and different from others of different clusters.

Any other suitable algorithm is understood to be usable in the invention, for example specific method commonly comprised in the general grouping of connectivity-based clustering (hierarchical clustering), distribution-based clustering, density-based clustering, grid-based clustering. Other future developments of clustering techniques will be suitable for the invention since the invention is not about clustering techniques as such.

Figure 7:
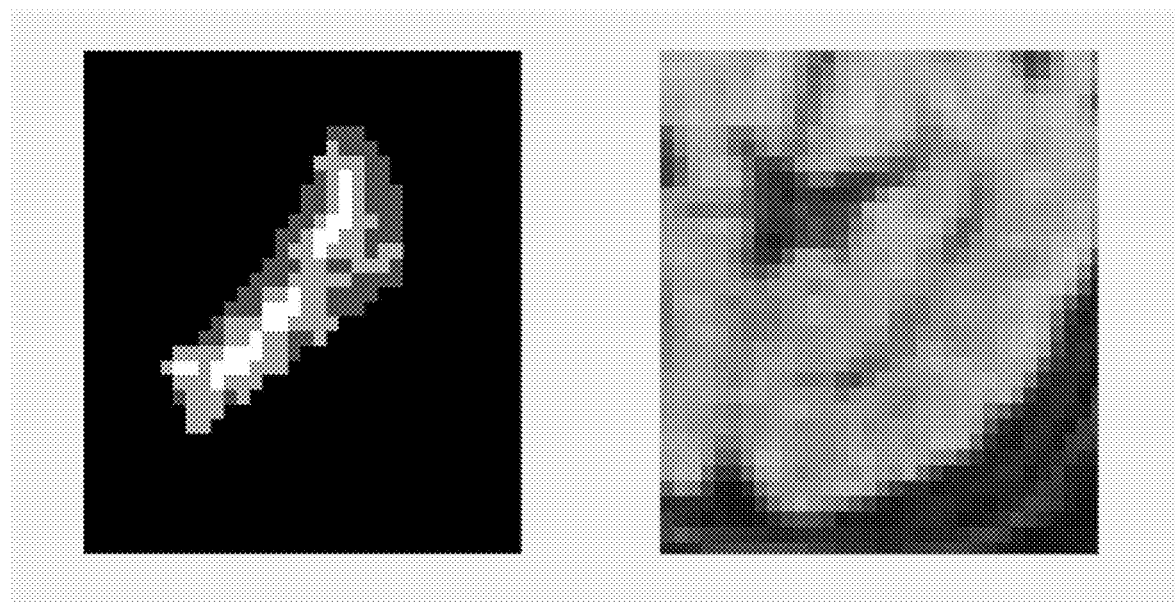
FIG. 7 shows a comparison between the real DWI image in (a), as enlarged on a ventricle (right side of the image), and the invention segmentation by k-means (k=4) in (a)

In the case of DWI matrices, the elements differ in the intensity of each pixel, so that the algorithm, when implemented with the above b-values, has been found able to discriminate between them in a manner consistent with the biological nature of the brain area of the fetus they belong to. As a result, the ventricular pixels are placed in the same cluster, which is different from the surrounding area clusters. The resulting segmentation is surprisingly and highly precise, so the error in isolating the ventricular pixels from others is minimized as seen in FIG. 7, where an extremal case (very small ventricle of only a few pixels thickness) was shown in order to highlight the precision of the segmentation.

Figure 8:
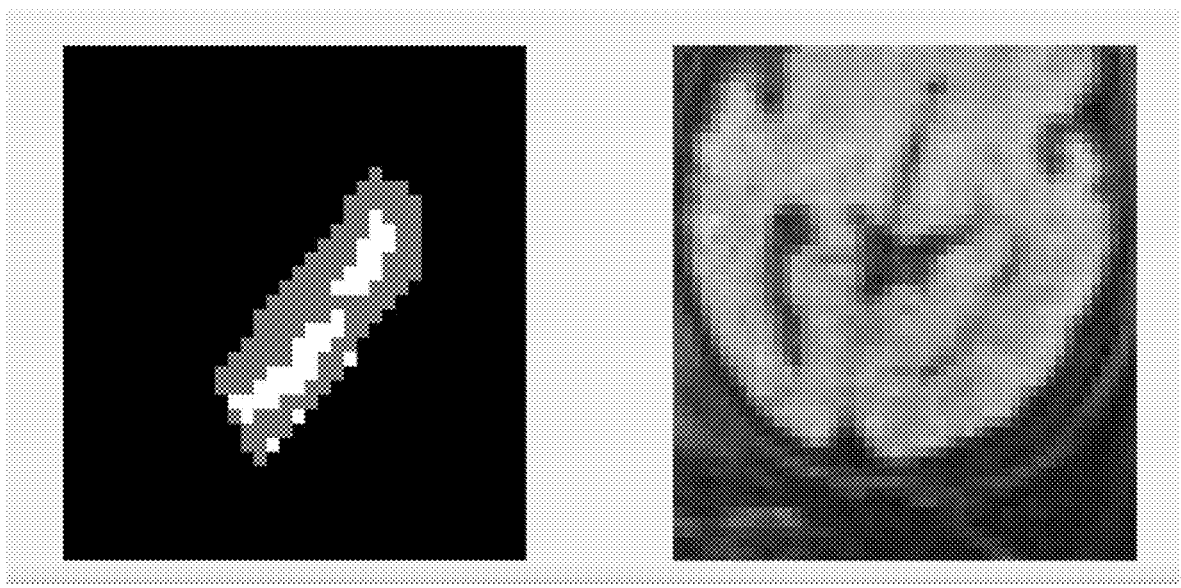
FIG. 8 shows a comparison between the real DWI image in (b), as enlarged on a ventricle (right side of the image) and the segmentation by k-means (k=3) in (a)

Different numbers of clusters have been tried to make sure that k-means could work as well as possible. The best candidate is k=4 as can also be seen in FIG. 8, in which a segmentation with k=3 (initial candidate) of the same ventricle as in FIG. 5 is shown.

This result is specific to the particular clusterization algorithm called k-means. Other clusterization algorithms will have other parameter(s) to adjust as a function of the manner of selection of the ROI. Indeed, a ROI can be selected by a very precise contouring of the ventricle as shown in FIG. 10 and in this case the experiments using the specific algorithm k-means have shown that the invention works well already from k=1 and the result of the invention method is remarkable for k=2 and larger values.

However, irrespective of the specific segmentation algorithm, as already stated above, one of the practical problems in radiography is to have the time to do a precise contouring. Most of the times, there is no time given to the doctor to do such a precise contouring. Hence, an independent but additional, synergistic problem solved by the invention is that of allowing a fast segmentation and therefore a fast volume calculation. This is realized by the invention by allowing the ROI selection to be performed by cutting out the DWI images in such a way to include portions of cerebral areas different from the ventricle, and to adapt the segmentation algorithm's parameters to achieve a sufficiently good segmentation.

Figure 6:
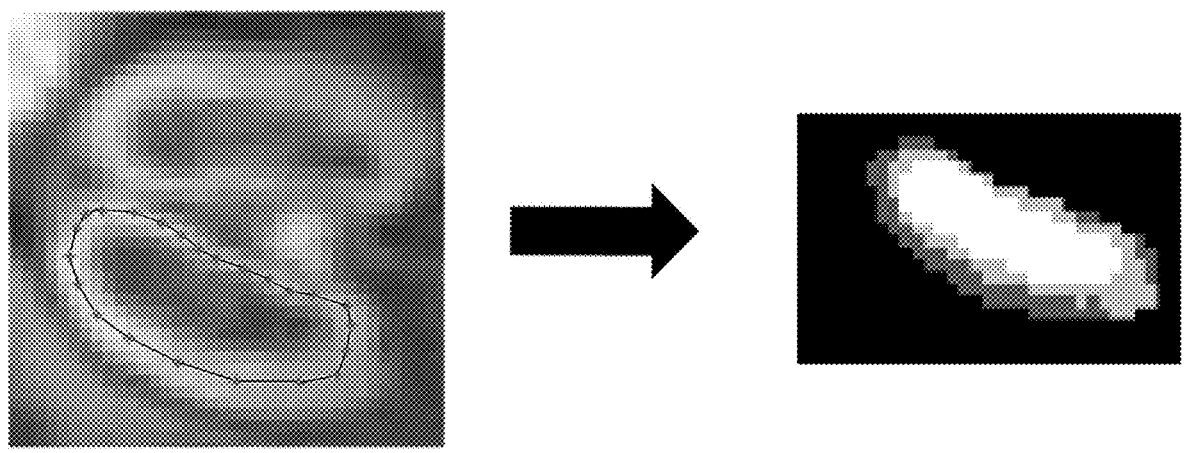
FIG. 6 shows two different ROI choices, the upper one without other brain areas around the ventricle, and the lower with those areas, on the right the results of segmentation according to the invention being shown.
Figure 6:
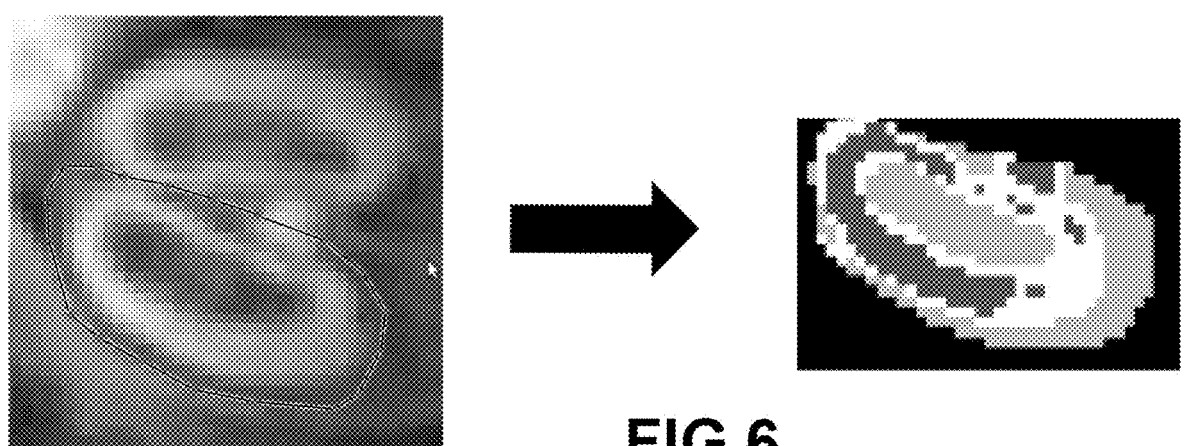
Figure 11:
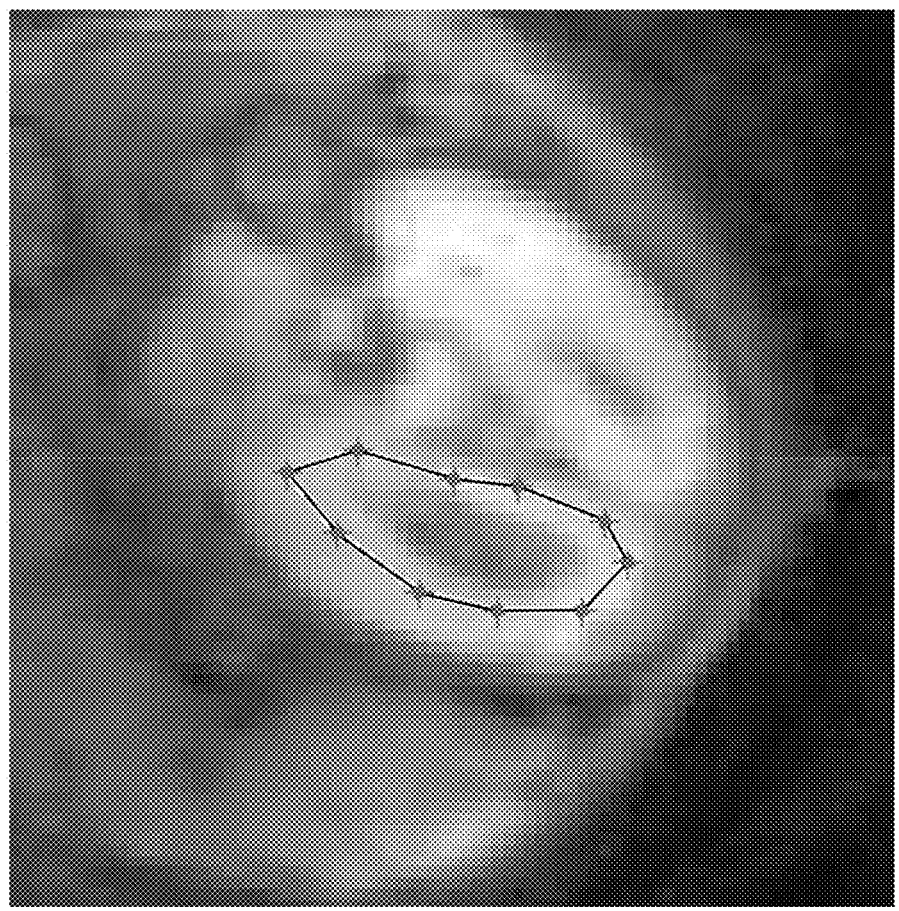
FIG. 11 shows a ROI selected by an imprecise contouring of the ventricle, wherein the contoured area completely contains the ventricle but is larger than this.
Figure 12:
FIG. 12 shows the result of a segmentation by k-means made on the contouring of FIG. 11 for k=3; and In FIGS. 13 (a), (b) and (c), the results with the same ROI as in FIG. 10 are shown for k=4,5,6 respectively.

In the case of k-means, a contouring like that in the upper-left image of FIG. 6 or that of FIG. 11 has proven acceptably effective for the values of k from k=3 as evidenced by FIG. 12 (obtained for k=3): the contour of the ventricle is quite well highlighted from the segmentation, and divided from the surrounding pixels being part of the same ROI.

Figure 10:
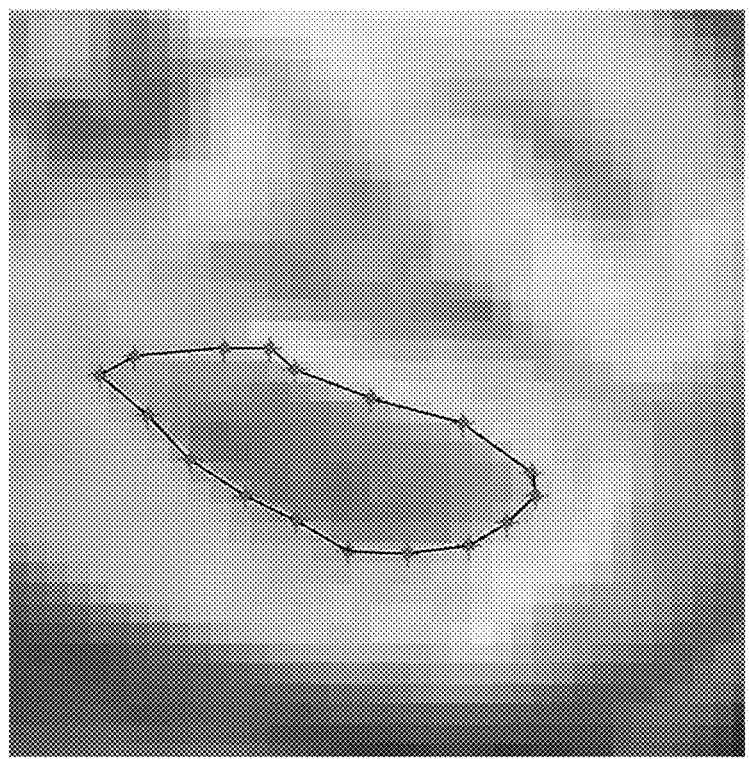
FIG. 10 shows a ROI selected by a very precise contouring of the ventricle.
Figure 13:
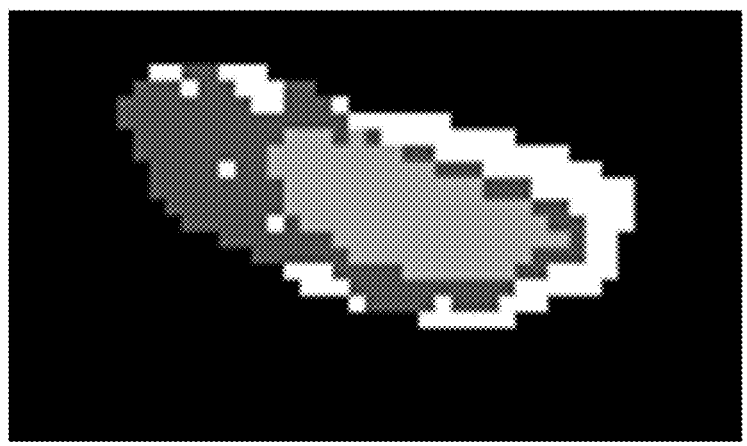
Figure 13:
Figure 13:
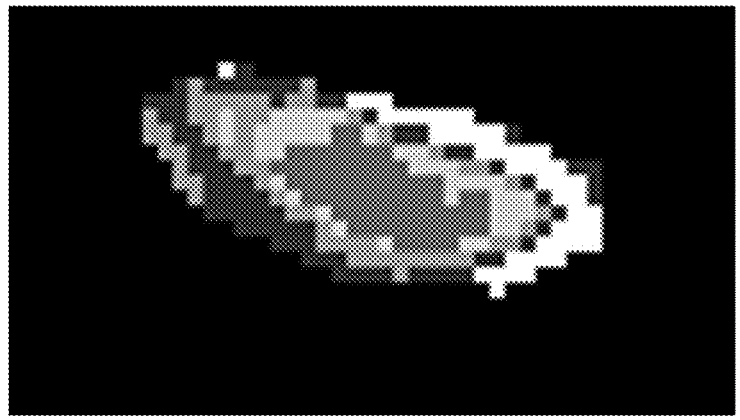

In FIGS. 13 (a), (b) and (c), the results with the same ROI as in FIG. 10 are shown for k=4,5,6 respectively. For k=4 we can see that the ventricle is well differentiated from the rest of the pixels, and even from a series of pixels whose intensity can look similar to the one of the ventricle pixels at a first sight, but actually is not. This effect can arise due to motion artifacts or because the intensity of the ventricle pixels pollutes also the intensity of the neighbor ones. For k=5 the clustering highlights very well the contour of the ventricle, and segments it from the rest of the pixels. For k=6 the k-means segmentation is a bit confusing (although still acceptable) since always more ventricle pixels are lost and divided from the core cluster to be assigned to other minor clusters.

In conclusion, based on the performed experiments using k-means and the rough contouring above, the acceptable range for k is between 3 and 5 with an optimal value of 4.

Similar experiments have been done using other segmentation algorithms with adjustment of respective clusterization parameters.

Volume Calculation

Concerning the volume calculation in block 127, after segmentation of the ventricles, the pixels of interest can be separated from the others. The sum of the number of ventricular pixels for each slice gives exactly the total number of pixels of the ventricle under examination. Starting from this number, the volume can be extracted by multiplying the total number of pixels by the volume of each voxel ($1.97 \times 1.97 \times 4$ mm$^3$). In this way, the space between one slice and another is perfectly covered. Any other method is suitable after segmentation of ventricles.

Due to the poor resolution, partial volume effects may arise in the image with the risk that the volume measurement may be overestimated. Typically, partial volume effects appear when different types of tissues occur in the same voxel which is the typical case of voxels in the first and last slice. To overcome this problem, it was decided to cut half the volume of the voxels in the first and last slice. The error associated with the measurement is exactly the amount of volume removed. In this way one can be sure that the true size of the ventricle lives within the best estimate and its error range. Clearly, acquiring DWIs with a smaller slice thickness (for example 2 mm or less) and a larger matrix (e.g. 256×256 or more), smaller voxels are obtained and this contributes to making the method more sensitive and precise. In particular, there would be a considerable reduction in the error on the estimated volumes of the ventricles. However, increasing the resolution of DWI images (thinner slice and better in-plane resolution) results in a decrease in the signal to noise ratio (SNR). We have developed VM Detector using a 1.5T scanner and currently 1.5T is the maximum magnetic field intensity used for fetal MRI investigations. However, already in Europe and in the world, 3T scanners are used which allow to obtain a better SNR as the SNR is proportional to the intensity of the magnetic field. Therefore, in perspective, VM Detector used with DWI acquisitions obtained a higher magnetic field could be even more sensitive and specific in quantifying differences between brain ventricular volumes.

Figure 9:
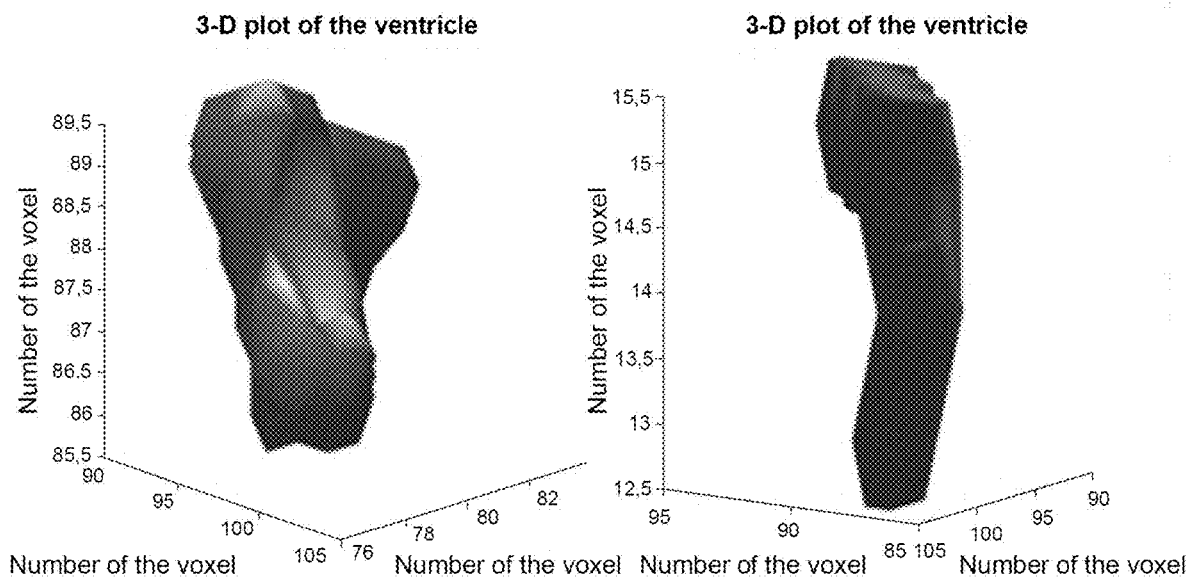
FIG. 9 shows a 3D plot of two fetal lateral ventricles as realized by the invention method.

In FIG. 9, two examples of three-dimensional ventricular reconstruction performed with the invention procedure are shown. As it is easy to see, the resulting shape of the ventricles is very faithful to the anatomical shape of the ventricles, confirming that this procedure reconstructs the true volume of the ventricles.

Calculation of Ventricles' Diameter

Figure 1:
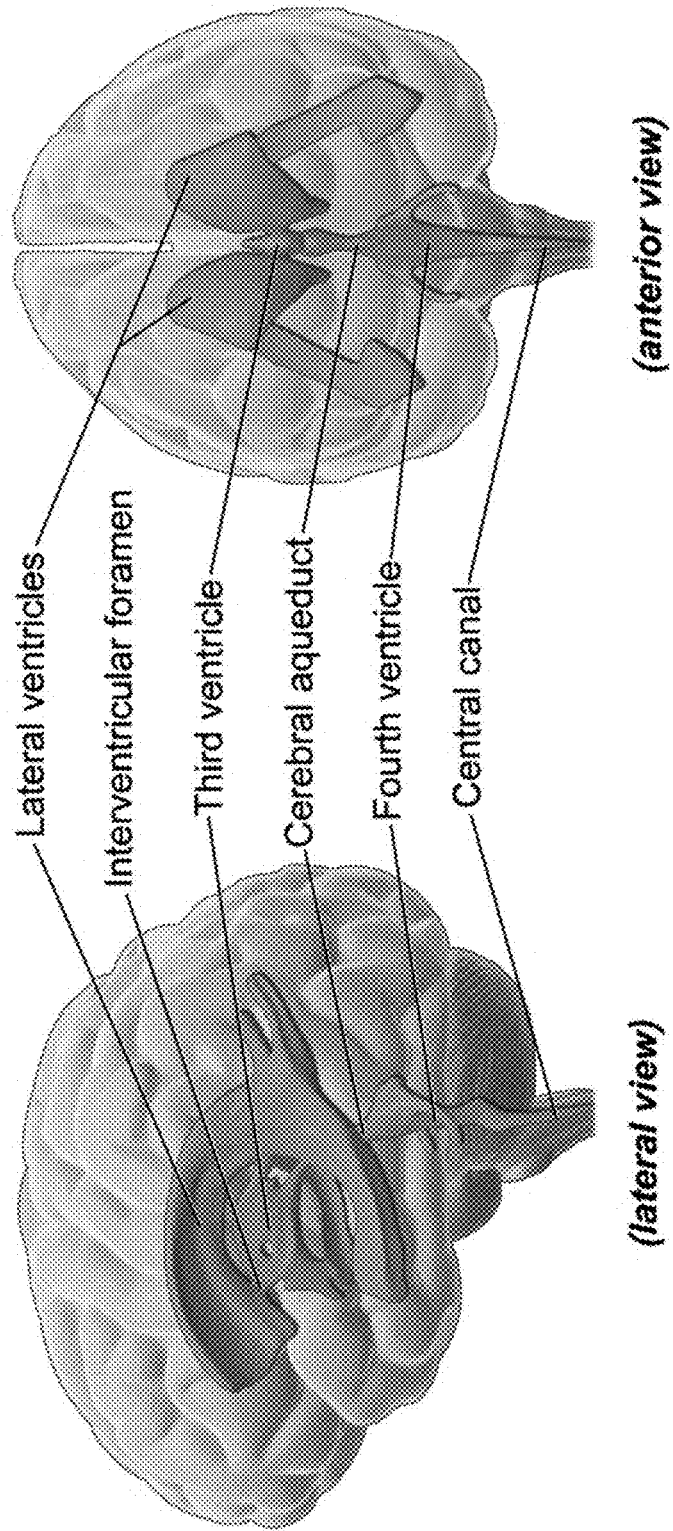
FIG. 1 shows an anatomical sketch of the fetus cerebral ventricles dealt with by the present invention.

Concerning the optional calculation of the diameter, not shown as a process block in FIG. 1A, to extract the diameter measurement, a MATLAB function called getpts was used. This function allows the user to select a specific point within an image and returns the corresponding coordinates. In this way, using this function on the image previously segmented by k-means, it is possible to select the extreme points of the diameter of the lateral ventricles on the largest slice of a very precise segmentation of the image. After selecting the points in question, the diameter can be trivially calculated as a Cartesian distance between them (measured in pixels) then multiplied by the linear dimension of each pixel (1.97 mm). The error associated with the measurement is exactly the linear dimension of a pixel (1.97 mm). Also in this case, the invention procedure provides better results than those that would be obtained from the calculation of the diameter carried out in the same way but on a raw DWI, due to the extreme precision of the segmentation provided by the invention procedure.

Experiments

The Inventors have tested the invention VM detection method in a cohort of healthy subjects and subjects with VM, by comparing the outcomes with both the volumes and the diameters of the ventricles. The outcomes-diameter correlation coefficient results no statistically significant ($p=0.05$) while the outcomes-volumes correlation shows high statistical significance ($p=0.0099$) as reported in the following tables:

TABLE 1

Correlation coefficients table

|  | Outcome class | Gestational Age |
|---|---|---|
| Computed Volumes | 0.6842 | 0.5469 |
| Medical Diameters | 0.5540 | 0.3567 |

TABLE 2

P-values table

|  | Outcome class | Gestational Age |
|---|---|---|
| Computed Volumes | 0.0099 | 0.0154 |
| Medical Diameters | 0.0495 | 0.1339 |

Furthermore, differently from the case of diameters, the volume of the lateral ventricles correlates with gestational age. This is an incredible advantage, because it would allow, given a large statistics available, to perform an early diagnosis, allowing the specialist to have a periodic and targeted monitoring of fetal brain development, in the specific case of prenatal diagnosis. Moreover, the prototype developed makes the user able to compare the volumetric measurements with the diameter ones (the measurement is performed the same way, i.e. manually choosing the extremes of the segment the users wants to know the size of), so as to maintain information regarding current guidelines on VM and use the new and more reliable volume-based method at the same time.

Therefore, according to the invention, it is provided a NMR diagnostic method, comprising the following steps:

Providing the NMR system according to the above description;

Acquiring the gestational age of a fetus;

Performing, by the NMR system, the steps A-D of the above method on the fetus; and Optionally, (Automatically, by computer) diagnosing a Ventriculomegaly condition on the basis of the ventricle volume and gestational age.

The diagnosis step of the method can be made on the basis of the difference between the volume as calculated by the volume calculation steps and a reference curve of the ventricle volume of healthy fetuses as a function of the gestational age.

Concerning gestational age, the invention has been tested, on a total statistics of 32 patients: 19 patients declared clinically HEALTH and 13 patients declared clinically ILL at the time of the pre-natal visit. The medical diagnosis was made to a specific GA (Gestational Age), or the number of weeks of pregnancy, in accordance with the current diagnostic protocol providing a reference value of the ventricular diameter of the lateral atrium. In both HEALTHY and ILL cases, the hypothesis of a correlation between gestational age and volume of the ventricles was evaluated.

Correlation tests were carried out with the Spearman's method:

$$\rho_s = 1 - \frac{6\sum_i D_i^2}{N(N^2 - 1)}$$

with D the distance between the ranks of the two columns and N number of elements of the dataset. This method calculates the degree of correlation between two values without making any assumptions about the linearity of this relationship, measuring the degree of correlation for any monotone relationship between two quantities.

For each patient, the value of the larger ventricle of the two is reported. Volumes of healthy patients showed a positive correlation with GA, shown below:

|  | Correlation coefficient | P-value |
|---|---|---|
| GA: COMPUTED VOLUME | 0.5469 | 0.0154 |
| GA: MEDICAL DIAMETER | 0.3567 | 0.1339 |

| GA (weeks of pregnancy) | COMPUTED VOLUME (cm³) | COMPUTED DIAMETER (mm) |
|---|---|---|
| 22 | 0.9244 ± 0.1880 | 6.8629 ± 1.9717 |
| 33 | 1.0028 ± 0.1724 | 6.6893 ± 1.9717 |
| 32 | 0.9714 ± 0.3604 | 6.0801 ± 1.9717 |
| 24 | 0.5092 ± 0.0862 | 5.1294 ± 1.9717 |
| 28 | 1.1203 ± 0.3682 | 6.9969 ± 1.9717 |
| 29 | 2.3503 ± 0.2037 | 7.1656 ± 1.9717 |
| 22 | 0.5014 ± 0.2664 | 5.5939 ± 1.9717 |
| 25 | 0.8069 ± 0.1175 | 6.1571 ± 1.9717 |
| 20 | 0.6894 ± 0.3134 | 4.5632 ± 1.9717 |
| 22 | 0.5719 ± 0.1882 | 5.8571 ± 1.9717 |
| 30 | 0.8383 ± 0.3995 | 6.1278 ± 1.9717 |
| 27 | 1.0420 ± 0.4309 | 7.3079 ± 1.9717 |
| 23 | 0.7521 ± 0.3604 | 8.1685 ± 1.9717 |
| 32 | 2.8517 ± 0.2194 | 10.5459 ± 1.9717 |
| 20 | 1.5590 ± 0.3055 | 7.6528 ± 1.9717 |
| 33 | 1.5747 ± 0.4936 | 8.5414 ± 1.9717 |
| 28 | 2.7028 ± 0.6346 | 8.3959 ± 1.9717 |
| 29 | 1.4258 ± 0.3447 | 7.0818 ± 1.9717 |
| 37 | 1.5277 ± 0.4936 | 7.1386 ± 1.9717 |

The values of the patient diameters measured with the method according to the invention do not correlate with GA (<0.4), in accordance with the current literature. The volumes of sick patients show no correlation with GA (<0.4): this result is a consequence of the fact that the disease manifests itself in different forms of severity depending on the different patient, making the hypothesis of correlation with time useless. The disease modifies the natural ventricular growth behavior, which under normal conditions correlates positively with GA.

The patient data-set is based on the volumes calculated with the method according to the invention, the values of the diameters calculated by the doctors with the method currently in force and on the actual development of the pathology in the first years of the child's life, called outcomes in this analysis. The outcomes were divided into 5 different severity classes, severity of cerebral edema and the actual symptoms reported after birth:

1. VM healed;
2. VM confirmed but with normal psychomotor development of the child;
3. VM confirmed, mild disturbances in the psychomotor development of the child;
4. VM confirmed, severe disturbances in the psychomotor development of the child, possible epileptic crises; and
5. VM confirmed, critical disturbances in the psychomotor development of the child, possible death (various causes).

|  | Correlation coefficent | P-value |
|---|---|---|
| OUTCOME CLASS: COMPUTED VOLUME | 0.6842 | 0.0099 |
| OUTCOME CLASS: MEDICAL DIAMETER | 0.5540 | 0.0495 |

| MEDICAL DIAMETER (mm) | COMPUTED VOLUME (cm³) | OUTCOME CLASS |
|---|---|---|
| 11 | 5.4135 ± 0.6972 | 3 |
| 12 | 2.4208 ± 0.3839 | 1 |
| 11 | 4.8494 ± 0.2585 | 2 |

| | | |
|---|---|---|
| 11 | 2.7890 ± 0.1645 | 1 |
| 12 | 3.7213 ± 0.3525 | 1 |
| 11 | 2.8830 ± 0.2272 | 2 |
| 12 | 1.4002 ± 0.1724 | 1 |
| 15 | 3.1415 ± 0.4779 | 5 |
| 13 | 5.0766 ± 0.2664 | 3 |
| 13 | 0.9244 ± 0.1097 | 1 |
| 15 | 4.7084 ± 0.3369 | 5 |
| 17 | 8.3435 ± 0.4779 | 3 |
| 32 | 50.4054 ± 0.5484 | 4 |

NMR Assessment Method

According to an aspect of the invention, a NMR assessment diagnostic method comprises the following steps:

Providing the NMR system comprising an NMR images acquisition device and a computer connected to it, wherein the computer comprises code means configured to execute, when run on a computer, the method steps according to the above invention method;

Acquiring the gestational age of a fetus;

Performing, by the computer, the steps of the invention method, wherein preliminarily in step of selecting a ROI on each of the DWI images around the ventricle is performed on DWI images taken from a computer memory; and Assessing a difference between the volume as calculated in the previous step and a reference curve of the ventricle volume of healthy fetuses as a function of the gestational age.

Advantages of the Invention

There are many advantages provided by the invention that, as mentioned in the previous sections, can be summarized in terms of efficiency, precision, speed and enhancement of the diagnosis as well as on an easy use of the program. Particularly, the better agreement of the volumetric analysis with the outcomes compared to the analysis of the ventricular diameter make VM Detector a very strong tool for both the prenatal diagnosis and the postnatal treatment.

This must not be seen as an attempt to substitute the specialist in the diagnosis, but as a tool to minimize as much as possible human evaluation errors concerning the measurement, so that the use of VM Detector, and therefore the diagnosis of the VM more generally, can become less subjective as possible.

Thanks to the database of the ventricular volumes of healthy fetuses according to the gestational age that has been realized by means of the invention method, the data evaluated with the procedure described above is immediately compared with the set of volume values. Patients and the doctor can therefore output the following information:

How much the estimated single volume differs from the average of healthy people at that gestational age, expressed in σ (therefore σ, 2σ, 3σ or more); and The value of the ventricular diameter to compare the new diagnostic (based on the calculation of volumes) with the conventionally used diagnostic.

BIBLIOGRAPHY

[1] Cardoza J. D., Goldstein RB. et al. Exclusion of fetal ventriculomegaly with a single measurement: the width of the lateral ventricular atrium. Radiology. 1988; 169: 711-714.

[2] Achiron R., Schimmel M. et al. Fetal mild idiopathic lateral ventriculomegaly: is there a correlation with fetal trisomy? Ultrasound in Obstetrics & Gynecology. 1993; 3: 89-92.

[3] Studholme C. Mapping Fetal Brain Development in utero Using MRI: The Big Bang of Brain Mapping. Annual Review of Biomedical Engineering. 2011; 13: 345-368.

[4] Orit A. Gleen, M R imaging in fetal brain, Pediater radiol., 2010 January; 40(1): 68-81.

[5] Pediaditis M., Leitgeb N. et al. RF-EMF exposure of fetus and mother during magnetic resonance imaging. Physics in Medicine & Biology. 2008; 53: 7187-7195.

[6] Budinger T. F. Nuclear magnetic resonance (NMR) in vivo studies: known thresholds for health effects. Journal of Computed Assist Tomography. 1981; 5: 800-811.

[7] G. S. Chilla et al, Diffusion weighted magnetic resonance imaging and its recent trend—a survey, Quant Imaging Medic Surg. 2015 June; 5(3): 407-422.

[8] Atam P. Dhawan, H. K. Huang, Dae-Shik Kim. Principles and Advanced Methods in Medical Imaging and Image Analysis, 2008

[9] Congenital Hydrocephalus, Adré J. du Plessis et al, Volpe's Neurology of the Newborn (Sixth Edition), 2018

[10] First-Trimester Detection of Fetal Anomalies, Raffaele Napolitano, Aris T Papageorghiou, Twining's Textbook of Fetal Abnormalities (Third Edition), 2015

[11] Mascalchi M, Filippi M, Floris R, Fonda C, Gasparotti R, Villari R. Diffusion-weighted MR of the brain: methodology and clinical application. Radiol Med 2005 March; 109(3):155-97.

[12] Malcolm I. Levene, Frank A. Chervenak. Fetal and Neonatal Neurology and Neurosurgery (Fourth edition). 2009

[13] JESSICA DUBOIS: "MRI of the Neonatal Brain: A Review of Methodological Challenges and Neuroscientific Advances", 18 Feb. 2020 (2020-02-18), XP009528962

[14] MAKROPOULOS ANTONIOS ET AL: "A review on automatic fetal and neonatal brain MRI segmentation", NEUROIMAGE, ELSEVIER, AMSTERDAM, NL, vol. 170, 28 Jun. 2017 (2017-06-28), pages 231-248, XP085367734, ISSN: 1053-8119, DOI: 10.1016/J.NEUROIMAGE.

In the foregoing, the preferred embodiments have been described and variants of the present invention have been suggested, but it is understood that those skilled in the art will be able to make modifications and changes without thereby departing from the relative scope of protection, as defined by the attached claims.

What is claimed is:

1. A computer-implemented method for determining a fetus ventricular volume from magnetic resonance diffusion-weighted imaging (DWI) images, comprising:

A) acquiring DWI images, having a pre-set voxel height, of a fetus ventricle, wherein acquisition is made with a single b-value selected in a range between 200 and 1000 s/mm$^2$;

B) selecting a region of interest (ROI) on each of the DWI images around the fetus ventricle;

C) automatically clusterizing pixels in the ROI, obtaining clusterized DWI images; and D) calculating the fetus ventricular volume based on the number of pixels in the ROI for each of the DWI images and the pre-set voxel height.

2. The computer-implemented method of claim 1, wherein the single b-value is between 600 and 800 s/mm$^2$.

3. The computer-implemented method of claim 1, wherein step C) is performed by an expert algorithm.

4. The computer-implemented method of claim 1, wherein step B) is performed by cutting out the DWI images so as to include portions of cerebral areas different from the fetus ventricle.

5. The computer-implemented method of claim 4, wherein the portions of cerebral areas of the DWI images have a pixel intensity comparable to a pixel intensity of the fetus ventricle with respect to a same pre-set intensity scale.

6. The computer-implemented method of claim 1, wherein step D) is performed by summing the number of ventricular pixels for each DWI image and multiplying a sum of the ventricular pixels by a voxel volume.

7. The computer-implemented method of claim 1, wherein in step A) the DWI images are denoised, and realigned to remove motion artefacts.

8. The computer-implemented method of claim 1, further comprising
E) measuring a ventricle diameter on the clusterized DWI images.

9. The computer-implemented method of claim 1, wherein clusterization in step C) is performed by k-means.

10. The computer-implemented method of claim 9, wherein a value of k is chosen in a range from 3 to 5.

11. The computer-implemented method of claim 10, wherein the value of k is 4.

12. A non-transitory computer readable medium storing a computer program, comprising code means which, when executed by a computer, cause the computer to perform the method any of claim 1.

13. A nuclear magnetic resonance (NMR) system, comprising an NMR images acquisition device and a computer connected to the NMR images acquisition device, wherein the computer is configured perform the method of claim 1.

14. A nuclear magnetic resonance (NMR) assessment method, comprising:
acquiring a gestational age of a fetus;
performing on the fetus, by a computer, steps B)-D) of a method for determining a fetus ventricular volume from magnetic resonance diffusion-weighted imaging (DWI) images, comprising:
A) acquiring DWI images, having a pre-set voxel height, of a fetus ventricle, wherein acquisition is made with a single b-value selected in a range between 200 and 1000 s/mm$^2$;
B) selecting a region of interest (ROI) on each of the DWI images around the fetus ventricle;
C) automatically clusterizing pixels in the ROI, obtaining clusterized DWI images; and
D) calculating the fetus ventricular volume based on the number of pixels in the ROI for each of the DWI images and the pre-set voxel height,
wherein preliminarily in step B) DWI images including a representation of the fetus are taken from a computer memory; and
assessing a difference between the fetus ventricular volume as calculated and a reference curve of a ventricular volume of healthy fetuses as a function of the gestational age.

15. The computer-implemented method of claim 9, wherein step B) is performed by cutting out the DWI images so as to include portions of cerebral areas different from the fetus ventricle.

* * * * *